(12) United States Patent
Shimano et al.

(10) Patent No.: US 11,384,514 B2
(45) Date of Patent: Jul. 12, 2022

(54) EARTHMOVING MACHINE, CALIBRATION SYSTEM, AND METHOD

(71) Applicant: KOMATSU LTD., Tokyo (JP)

(72) Inventors: Yuki Shimano, Tokyo (JP); Tomohiro Nakagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 290 days.

(21) Appl. No.: 16/619,585

(22) PCT Filed: Jul. 4, 2018

(86) PCT No.: PCT/JP2018/025316
§ 371 (c)(1),
(2) Date: Dec. 5, 2019

(87) PCT Pub. No.: WO2019/013060
PCT Pub. Date: Jan. 17, 2019

(65) Prior Publication Data
US 2020/0157774 A1    May 21, 2020

(30) Foreign Application Priority Data

Jul. 14, 2017  (JP) .............................. JP2017-138352

(51) Int. Cl.
*E02F 9/26* (2006.01)
*E02F 3/32* (2006.01)

(52) U.S. Cl.
CPC ............... *E02F 9/264* (2013.01); *E02F 3/32* (2013.01)

(58) Field of Classification Search
CPC ... E02F 3/32; E02F 3/435; E02F 9/262; E02F 9/264; G01B 11/00
See application file for complete search history.

(56) References Cited

U.S. PATENT DOCUMENTS

| 9,598,845 B2* | 3/2017 | Baba ....................... E02F 3/437 |
| 9,739,038 B2* | 8/2017 | Baba ....................... E02F 9/262 |
| 2001/0056488 A1 | 12/2001 | Maeda et al. |
| 2006/0230645 A1 | 10/2006 | McCain |
| 2008/0319710 A1 | 12/2008 | Hsu et al. |
| 2009/0139119 A1 | 6/2009 | Janardhan et al. |
| 2013/0033963 A1 | 2/2013 | Lindskov |
| 2013/0158789 A1 | 6/2013 | Seki |
| 2015/0330060 A1 | 11/2015 | Seki et al. |
| 2016/0040398 A1 | 2/2016 | Kitajima et al. |
| 2016/0237655 A1* | 8/2016 | Baba ..................... E02F 9/2037 |
| 2016/0251835 A1 | 9/2016 | Kitajima et al. |

(Continued)

FOREIGN PATENT DOCUMENTS

| CN | 105324540 A | 2/2016 |
| CN | 105431597 A | 3/2016 |
| CN | 105636658 A | 6/2016 |

(Continued)

*Primary Examiner* — Tyler J Lee
(74) *Attorney, Agent, or Firm* — Faegre Drinker Biddle & Reath LLP

(57) ABSTRACT

An earthmoving machine of a work vehicle or the like includes: a work implement including a bucket having teeth; and a main controller that obtains design data based on a dimension obtained from manufacturing data of a component included in the work implement, and used for calculating the position of the teeth, and uses the design data to calculate the position of the teeth.

12 Claims, 14 Drawing Sheets

(56) References Cited

U.S. PATENT DOCUMENTS

2016/0251836 A1\* 9/2016 Baba ..................... E02F 9/123
                                                   701/50

FOREIGN PATENT DOCUMENTS

| CN | 105324540 B     | 12/2017 |
|----|-----------------|---------|
| JP | H09-256416 A    | 9/1997  |
| JP | 2001-132021 A   | 5/2001  |
| JP | 2001-312524 A   | 11/2001 |
| JP | 2003-141179 A   | 5/2003  |
| JP | 2004-227184 A   | 8/2004  |
| JP | 2004-232343 A   | 8/2004  |
| JP | 3836280 B2      | 10/2006 |
| JP | 4323678 B2      | 9/2009  |
| JP | 2011-508187 A   | 3/2011  |
| JP | 2012-202063 A   | 10/2012 |
| JP | 2016-224038 A   | 12/2016 |
| WO | WO-2015/173920 A1 | 11/2015 |
| WO | WO-2015/186180 A1 | 12/2015 |

\* cited by examiner

FIG.2

| No. | MEMBER | PIN HOLE | DESIGN DATA (CENTER POSITION) | WORKING DATA (CENTER POSITION) |
|---|---|---|---|---|
| 1 | BOOM | HOLE FOR FOOT PIN | (X10,Y10,Z10) | (X11,Y11,Z11) |
| 2 | | HOLE FOR CONNECTION WITH DIPPER STICK 120 | (X20,Y20,Z20) | (X21,Y21,Z21) |
| 3 | | HOLE OF ATTACHMENT PORTION FOR BOOM CYLINDER 111 (ON THE ROD SIDE) | (X30,Y30,Z30) | (X31,Y31,Z31) |
| 4 | | HOLE OF ATTACHMENT PORTION FOR DIPPER STICK CYLINDER 121 (ON THE BOTTOM SIDE) | (X40,Y40,Z40) | (X41,Y41,Z41) |
| 5 | DIPPER STICK | HOLE OF ATTACHMENT PORTION FOR DIPPER STICK CYLINDER 111 (ON THE ROD SIDE) | (X50,Y50,Z50) | (X51,Y51,Z51) |
| 6 | | A HOLE FOR CONNECTION WITH BOOM 110 | (X60,Y60,Z60) | (X61,Y61,Z61) |
| 7 | | HOLE OF ATTACHMENT PORTION FOR BUCKET CYLINDER 131 (ON THE BOTTOM SIDE) | (X70,Y70,Z70) | (X71,Y71,Z71) |

FIG.5

| No. | PARAMETER | UNIT | DESIGN DATA | WORKING DATA-BASED DIMENSION | IMAGE DATA-BASED DIMENSION |
|---|---|---|---|---|---|
| 1 | L01 | mm | ***6.5 | – | ***4.2 |
| 2 | L02 | mm | **3.1 | – | – |
| 3 | L11 | mm | ***1.2 | ***3.5 | – |
| 4 | L12 | mm | ***3.4 | ***5.1 | – |
| 5 | L13 | mm | ***8.4 | ***6.6 | – |
| 6 | L21 | mm | **7.6 | **6.9 | – |
| 7 | L22 | mm | ***4.2 | ***4.8 | – |
| 8 | L23 | mm | ***9.1 | ***8.7 | – |
| 9 | L24 | mm | **3.3 | **3.7 | – |
| 10 | L31 | mm | **2.9 | – | ***5.0 |
| 11 | L32 | mm | ***6.7 | – | – |
| 12 | L33 | mm | ***5.5 | – | – |
| 13 | L34 | mm | ***3.6 | – | – |
| 14 | Phibm | deg | **.7 | – | – |
| 15 | Phiam | deg | **.3 | – | – |
| 16 | Phibk | deg | **.2 | – | – |
| 17 | Lbms | mm | ***7.7 | – | – |
| 18 | Lams | mm | ***4.4 | – | – |
| 19 | Lbks | mm | ***2.8 | – | – |

FIG.6

| No. | PARAMETER | DESIGN DATA | WORKING DATA-BASED DIMENSION | IMAGE DATA-BASED DIMENSION | CALIBRATED DATA |
|---|---|---|---|---|---|
| 1 | L01 | | – | ***4.2 | **3.8 |
| 2 | L02 | ***3.1 | – | – | ***2.2 |
| 3 | L11 | | ***3.5 | – | ***3.7 |
| 4 | L12 | | ***5.1 | – | ***5.5 |
| 5 | L13 | | ***6.6 | – | ***6.4 |
| 6 | L21 | | **6.9 | – | **6.8 |
| 7 | L22 | | ***4.8 | – | ***4.1 |
| 8 | L23 | | ***8.7 | – | ***7.9 |
| 9 | L24 | | **3.7 | – | **3.1 |
| 10 | L31 | | – | ***5.0 | ***4.2 |
| 11 | L32 | ***6.7 | – | – | ***6.4 |
| 12 | L33 | ***5.5 | – | – | ***5.9 |
| 13 | L34 | ***3.6 | – | – | ***4.1 |
| 14 | Phibm | **.7 | – | – | **.9 |
| 15 | Phiam | **.3 | – | – | **.5 |
| 16 | Phibk | **.2 | – | – | **.8 |
| 17 | Lbms | ***7.7 | – | – | ***6.9 |
| 18 | Lams | ***4.4 | – | – | ***3.1 |
| 19 | Lbks | ***2.8 | – | – | ***3.4 |

MACHINE NUMBER: A102**** — D7

| POSITION | WORKING DATA (COORDINATE DATA) | IMAGE DATA (COORDINATE DATA) |
|---|---|---|
| P11 | (X11,Y11,Z11) | (X01,Y01,Z01) |
| P12 | (X31,Y31,Z31) | — |
| P13 | (X41,Y41,Z41) | — |
| P14 | (X21,Y21,Z21) | — |
| P21 | (X61,Y61,Z61) | — |
| P22 | (X51,Y51,Z51) | — |
| P23 | (X71,Y71,Z71) | — |
| P24 | (X**,Y**,Z**) | — |
| P25 | (X**,Y**,Z**) | — |
| P32 | (X**,Y**,Z**) | (X02,Y02,Z02) |
| P35 | (X**,Y**,Z**) | (X03,Y03,Z03) |
| P42 | — | (X04,Y04,Z04) |

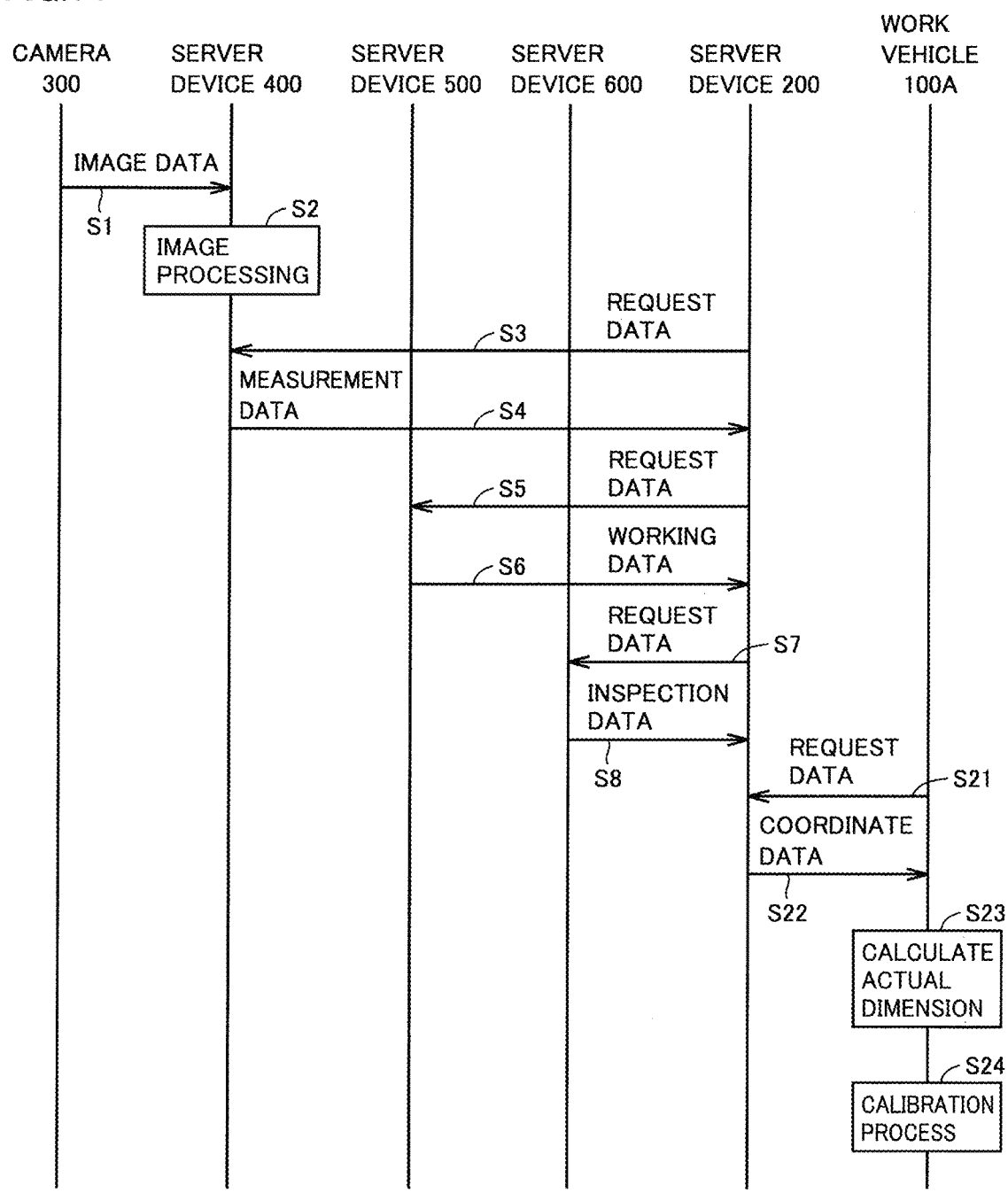

EARTHMOVING MACHINE, CALIBRATION SYSTEM, AND METHOD

TECHNICAL FIELD

The present invention relates to an earthmoving machine, a calibration system, and a method.

BACKGROUND ART

Conventionally, an earthmoving machine which calculates the bucket's teeth position based on the length of a cylinder is known. For such an earthmoving machine, in order to calculate the teeth position accurately, it is necessary to previously calibrate design data used to calculate the teeth position. For this calibration, actual dimension data between the locations of predetermined portions of the earthmoving machine is used. This actual dimension data is obtained by using a measuring instrument on an earthmoving machine production line.

CITATION LIST

Patent Literature

PTL 1: Japanese Patent Laying-Open No. 2004-232343
PTL 2: Japanese Patent Laying-Open No. 2004-227184

SUMMARY OF INVENTION

Technical Problem

Obtaining actual dimension data using a measuring instrument, as described above, requires some manpower and some amount of working time.

An object of the present invention is to provide an earthmoving machine, a calibration system, and a method capable of quickly obtaining design data used to calculate a teeth position.

Solution to Problem

In one aspect of the present invention, an earthmoving machine comprises: a work implement including a bucket having teeth; and a controller that obtains, based on a first dimension obtained from manufacturing data of a component included in the work implement, first design data used for calculating the position of the teeth, and uses the first design data to calculate the position of the teeth.

Advantageous Effects of Invention

The invention as described above allows design data used for calculating a teeth position to be quickly obtained.

BRIEF DESCRIPTION OF DRAWINGS

FIG. 2 illustrates one example of design data and working data stored in a server device.
FIG. 5 generally represents data stored in a work vehicle.
FIG. 6 shows data for illustrating a calibration process and calibrated values.
FIG. 8 represents a schematic configuration of data.
FIG. 14 is a sequence diagram for illustrating a flow of a process in a calibration system according to another embodiment.

DESCRIPTION OF EMBODIMENTS

Hereinafter, an embodiment will be described with reference to the drawings. In the following description, identical components are identically denoted. Their names and functions are also identical. Accordingly, they will not be described repeatedly. It is planned from the beginning to combine and use a configuration in an embodiment, as appropriate. Some components may not be used.

Hereinafter, a work vehicle as an example of an earthmoving machine (for example, a work machine) will be described with reference to the drawings. In the following description, "upper," "lower," "front," "rear," "right," and "left" are terms with reference to an operator seated on an operator's seat of the work vehicle.

In the following, as a work vehicle, a hydraulic excavator will be described as an example. In particular, an information and communication technology (ICT) hydraulic excavator will be described as an example.

First Embodiment

Figure 1:
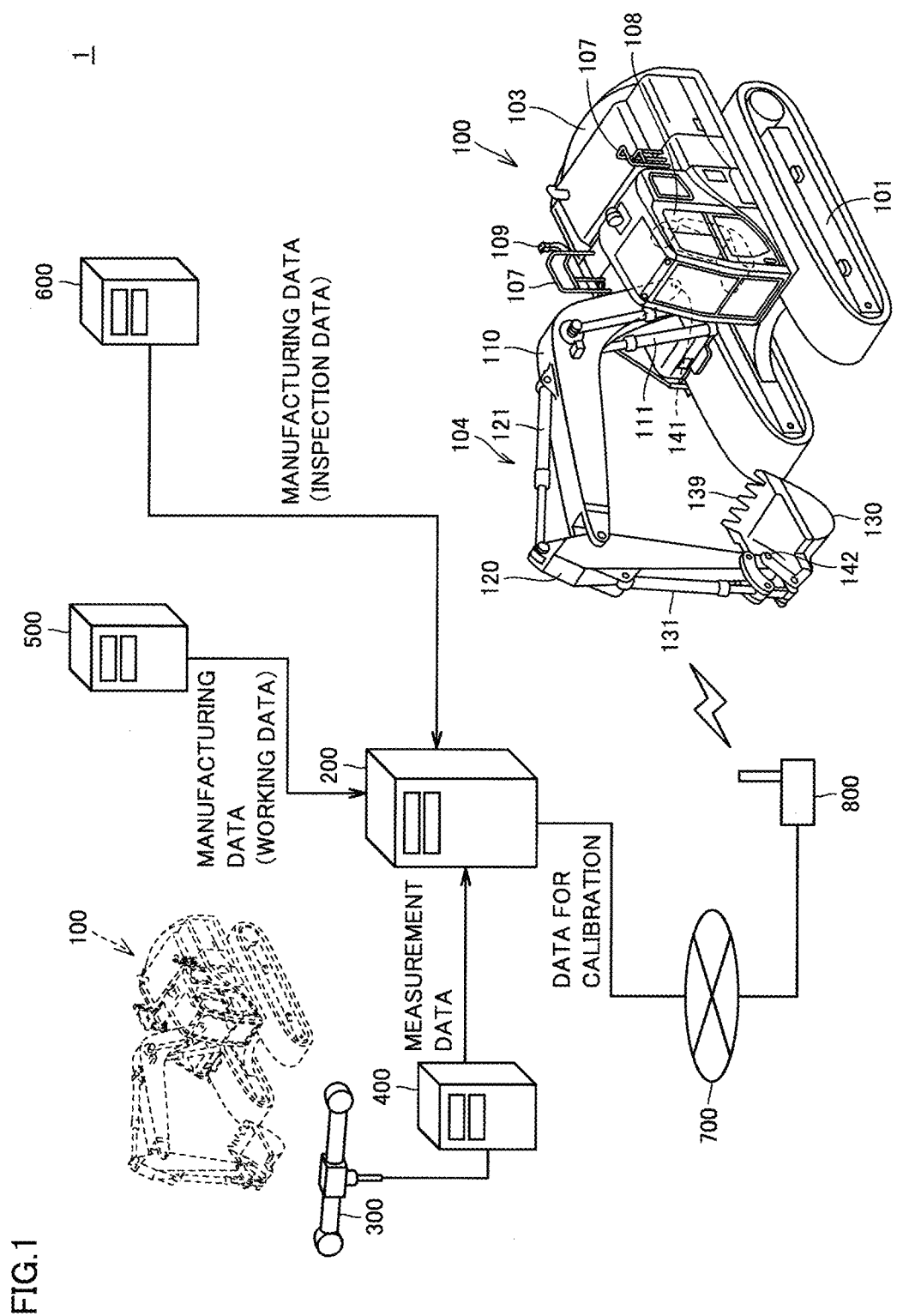
FIG. 1 is a diagram showing a schematic configuration of a calibration system based on an embodiment.

<General Configuration>
FIG. 1 is a diagram showing a schematic configuration of a calibration system based on an embodiment.

As shown in FIG. 1, a calibration system 1 includes a work vehicle 100, a plurality of server devices 200, 400, 500, and 600, a camera 300, and a transceiver 800.

Camera 300 and server device 400 are communicably connected. Server device 200 and server devices 400, 500, and 600 are communicably connected. Server device 200 is communicably connected to transceiver 800 via a network 700 such as the Internet.

(1) General Configuration of Work Vehicle 100
As shown in FIG. 1, work vehicle 100 mainly includes a travel unit 101, a revolving unit 103, a work implement 104, and a receiving antenna 109 for the Global Positioning Satellite System (GNSS). Work vehicle 100 has a main body composed of travel unit 101 and revolving unit 103. Travel unit 101 has a pair of right and left crawler belts. Revolving unit 103 is mounted via a revolving mechanism of an upper portion of travel unit 101 revolvably.

Work implement 104 is pivotally supported at revolving unit 103 so as to be movable upward and downward and performs a work such as excavation of soil. Work implement 104 includes a boom 110, a dipper stick 120, a bucket 130, a boom cylinder 111, a dipper stick cylinder 121, and a bucket cylinder 131.

Boom 110 has a base movably coupled to revolving unit 103. Dipper stick 120 is movably coupled to the distal end of boom 110. Bucket 130 is movably coupled to the distal end of dipper stick 120. Revolving unit 103 includes an operator's cab 8 and a handrail 107. In the present example, receiving antenna 109 is attached to handrail 107.

Boom 110 is driven by boom cylinder 111. Dipper stick 120 is driven by dipper stick cylinder 121. Bucket 130 is driven by bucket cylinder 131.

(2) Three-Dimensional Measurement

Camera 300 is a camera for three-dimensional measurement. Camera 300 has a dual camera sensor. Camera 300 previously images work vehicle 100 having a plurality of predetermined portions each with a reflector attached thereto and thus obtains image data, and sends the image data to server device 400. In the present example, the reflectors are attached to receiving antenna 109, the teeth of bucket 130, a foot pin 141, and a bucket pin 142.

Server device 400 has software pre-installed therein for obtaining three-dimensional data (3D data). Server device 400 calculates three-dimensional coordinate data of the reflectors based on the three-dimensional image data sent from camera 300 (hereinafter also referred to as "measurement data"). Thus, measurement data is obtained from image data.

Server device 400 calculates three-dimensional coordinate data of the reflectors for each of a plurality of work vehicles 100. Server device 400 associates the coordinate data with each machine number and thus stores the data.

In response to a request from server device 200, server device 400 associates coordinate data with a machine number and thus transmits the coordinate data to server device 200.

(3) Manufacturing Data

Server devices 500 and 600 associate manufacturing data of components included in work implement 104 with a work vehicle's machine number, and thus store the manufacturing data therein. The manufacturing data includes actual machining data obtained through machining (hereinafter also referred to as "working data"), and inspection data obtained by inspecting a product.

The working data is data representing an actual working position in machining and it is different from design data. Machining is typically performed by a machine tool (not shown).

Server device 500 associates working data of components included in work implement 104, such as boom 110 and dipper stick 120, with a work vehicle's machine number, and thus stores the working data therein. Server device 500 stores therein for example the position (or coordinate data) of a pin hole as the working data described above.

In response to a request from server device 200, server device 500 associates coordinate data as working data with a machine number and thus transmits the coordinate data to server device 200.

Server device 600 associates inspection data of components included in work implement 104, such as boom cylinder 111, dipper stick cylinder 121, bucket cylinder 131, etc., with the machine number of work vehicle 100 to which these cylinders are to be attached, and thus stores the inspection data therein. Server device 600 stores actual measurement data therein as the inspection data.

For example, server device 600 stores therein as the actual measurement data the cylinder lengths that these cylinders have when they are maximally extended and the cylinder lengths that they have when they are maximally contracted.

In response to a request from server device 200, server device 600 associates actual measurement data as inspection data with a machine number and thus transmits the actual measurement data to server device 200.

(4) Generating Actual Dimension Data

Server device 200 associates measurement data (coordinate data) obtained from server device 400, working data (coordinate data) obtained from server device 500, and inspection data (actual measurement data) obtained from server device 600 with the machine number of work vehicle 100, and thus manages the data. By such processing, server device 200 will manage data of a plurality of work vehicles 100 individually.

Server device 200 calculates actual dimension data from measurement data. Server device 200 also calculates actual dimension data from working data. As will more specifically be described hereinafter, server device 200 calculates a length between two coordinates (actual dimension data) based on coordinate data.

In response to a request from work vehicle 100, server device 200 transmits actual dimension data of the requester work vehicle 100 to the requester work vehicle 100 as data for calibration.

(5) Outline of Calibration Process

Work vehicle 100 obtains data from server device 200 for calibration of the work vehicle. Work vehicle 100 uses the data for calibration to calibrate design data (or a parameter) used to calculate the teeth position. Specifically, work vehicle 100 uses data used for calibration and representing a dimension to change a plurality of default values (a designed dimension and a design angle) used to calculate the position of the teeth. The calibration process will more specifically be described hereinafter.

<Design Data and Working Data>

Before more specifically describing the calibration process, design data and working data of predetermined components included in work vehicle 100 will be described.

FIG. 2 illustrates one example of design data and working data stored in server device 500.

As shown in FIG. 2, in data D2, design data and working data are stored in association with each of pin holes of boom 110 and dipper stick 120. Further, server device 500 associates such data D2 with a machine number of work vehicle 100 and thus stores the data for each work vehicle. In the example of data D2, the design data and the working data represent the center position of a pin hole. In the present example, the design data representing the center position is per se not calibrated; rather, a dimension between two such center positions (design data) is calibrated.

Note that the design data is the same for the same type of work vehicles, and accordingly, it may not be directly associated with the working data, as shown in FIG. 2.

Figure 3:
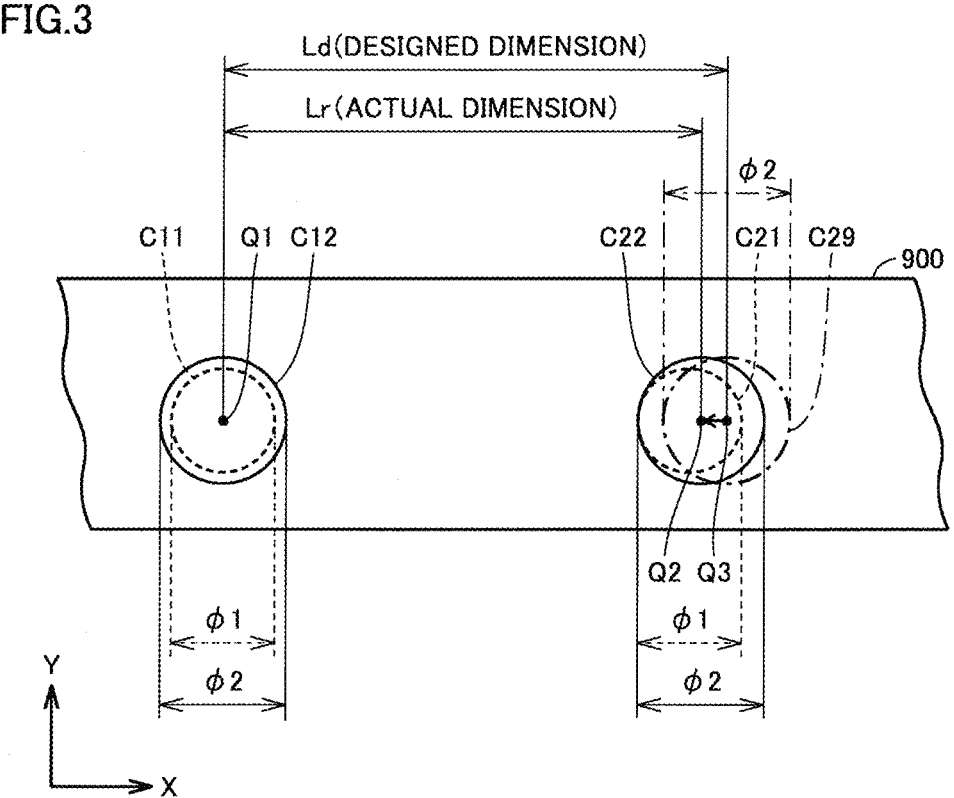
FIG. 3 illustrates a reason why working data is offset from design data.

FIG. 3 illustrates a reason why the working data is offset from the design data.

As shown in FIG. 3, a case where two holes C12 and C22 of a diameter of $\varphi 2$ are formed in a casting 900 will be described as an example. Casting 900 corresponds to boom 110 and dipper stick 120.

Casting 900 has two pilot holes C11 and C21 of a diameter $\varphi 1$ already formed before two holes C12 and C22 of a diameter $\varphi 2$ are formed with a machine tool (when the casting is completed).

The two holes to be formed based on pilot holes C11 and C21 have design data with center positions Q1 and Q3 having coordinate values of (Xa, Ya) and (Xc, Yc), respectively, for the sake of illustration. Further, pilot hole C11 has center position Q1 having coordinates (Xa, Ya) and pilot hole C21 has a center position offset from center position Q3 of the design data for the sake of illustration.

In that case, the center position of pilot hole C11 matches the center position of the design data, and the machine tool can match the center position of hole C12 with center position Q1 of pilot hole C11. However, the center position of pilot hole C21 does not match center position Q3 of the design data, and, depending on the relationship between φ1 and φ2, the machine tool cannot form a hole having a diameter of φ2 (a round hole) with Q3 (Xc, Yc) serving as a center. Therefore, the machine tool forms a hole having a diameter of φ2 with Q2 (Xb, Yb) serving as a center. Note that center position Q2 is a position which allows a hole of diameter φ2 to be formed and provides a shortest distance from center position Q3 of the design data.

Thus, center position Q3 of the design data and center position Q2 of the working data will be different positions. Thus, the working data is offset from the design data.

Note that such a process which changes the position of a hole from the design data is previously defined by an NC program in the machine tool. Further, the machine tool stores the working data therein, and the working data is transmitted to server device 500 or the like.

<Details of Calibration Process>

As has been described above, main controller 150 (see FIG. 10) of work vehicle 100 uses data used for calibration and representing a plurality of dimensions (actual dimension data) to calibrate a plurality of pieces of design data used to calculate the position of teeth 139. The design data includes dimension (or length) and angle.

Main controller 150 performs calibration using actual dimension data transmitted from server device 200 and known design data (a portion of a plurality of pieces of design data). As an example, it is assumed that 19 parameters are required to calculate the position of teeth 139. For some of the 19 parameters, main controller 150 does not use the design data and instead uses the actual dimension data obtained from server device 200 and, for the remainder, uses the design data per se to thus calibrate the 19 parameters (the design data). This process will be described in a specific example with reference to FIGS. 5 and 6.

In the following, for the sake of illustration, a case will be described by way of example in which a plurality of pieces of design data are calibrated without using inspection data (actual measurement data of cylinder length) obtained from server device 600. It is also possible as a matter of course to use inspection data obtained from server device 600.

Figure 4:
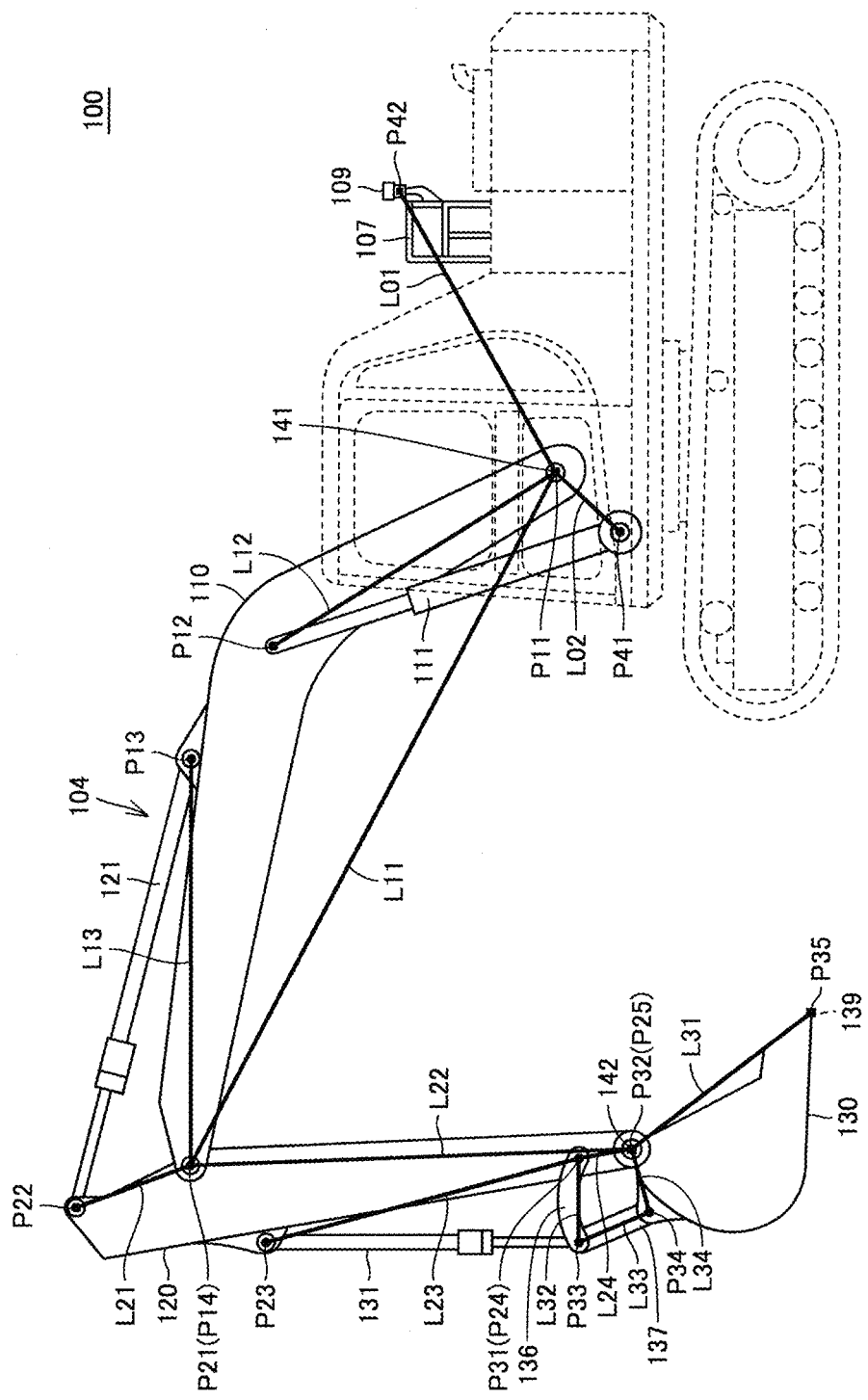
FIG. 4 is a diagram for illustrating some of dimensions used for calculating a teeth position.

FIG. 4 is a diagram for illustrating some of dimensions used for calculating the position of teeth 139. In the following, parts for which actual dimension data is used and those for which design data is used will separately be described. Further, the actual dimension data is divided into measurement data obtained via server device 400 and working data obtained via server device 500 in the following description. It should be noted that the following is only an example and the present invention is not limited thereto.

(1) Parts for Which a Working Data-Based Dimension (or Actual Dimension Data) is Used Initially, dimensions for boom 110 will be described. As shown in FIG. 4, main controller 150 in performing calibration uses working data-based dimensions for a distance L11 between positions P11 and P14, a distance L12 between positions P11 and P12, and a distance L13 between positions P13 and P14.

Position P11 is the position of the hole receiving foot pin 141 for attaching boom 110 to the body of the work vehicle. Further, a reflector is attached to foot pin 141, as has been described above. Therefore, position P11 is also the position of the reflector attached to foot pin 141. Position P12 is a position where a pin is inserted for fixing the rod of boom cylinder 111 to boom 110. Position P13 is a position where a pin is inserted for fixing the bottom of dipper stick cylinder 121 to boom 110. Position P14 is a position where a pin is inserted for connecting dipper stick 120 to boom 110.

Dimensions for dipper stick 120 will be described. Main controller 150 uses working data-based dimensions for a distance L21 between positions P21 and P22, a distance L22 between positions P21 and P25, a distance L23 between positions P23 and P24, and a distance L24 between positions P24 and P25.

Position P21 is a position where a pin is inserted for connecting dipper stick 120 to boom 110. Position P22 is a position where a pin is inserted for fixing the rod of dipper stick cylinder 121 to dipper stick 120. Position P23 is a position where a pin is inserted for fixing the bottom of bucket cylinder 131 to dipper stick 120. Position P24 is a position where a pin is inserted for fixing one end of a link mechanism 136 of bucket 130 to dipper stick 120. Link mechanism 136 has the other end connected to the tip of the rod of bucket cylinder 131 by a pin. Position P25 is a position where bucket pin 142 is inserted for connecting dipper stick 120 to bucket 130.

Thus, when main controller 150 performs calibration, main controller 150 does not use the design data and instead uses a dimension calculated based on the working data (actual dimension data) for distances L11, L12, L13, L21, L22, L23, L24.

(2) Parts for Which a Measurement Data-Based Dimension (Actual Dimension Data) is Used For bucket 130 and the body of the working vehicle, dimensions based on measurement data obtained by imaging through camera 300 are used.

Specifically, main controller 150 in performing calibration uses measurement data-based dimensions for a distance L01 between positions P11 and P42 and a distance L31 between positions P32 and P35.

Position P42 is the position of the reflector attached to a predetermined portion of receiving antenna 109. Position P32 is the position of the reflector attached to bucket pin 142. Position P35 is the position of the reflector attached to a predetermined portion of teeth 139 of bucket 130. A reflector may be attached to a contour point of bucket 130.

Measurement data-based dimensions are used for distances L01 and L31 for the following reason:

Bucket 130 is replaced with another type of bucket 130 different in distance L31 by the user depending on the specific contents of the work of interest. Further, teeth 139 is welded or bolted to an end of the body of the bucket after the bucket's body is completed by machining. For this reason, if a working data-based dimension is used as distance L31, the position of teeth 139 cannot be calculated accurately.

In addition, receiving antenna 109 is installed at a final stage of a process for assembling the work vehicle, and accordingly, using the measurement data allows the position of teeth 139 to be calculated more accurately than using the working data.

For these reasons, measurement data-based dimensions are used for distances L01 and L31.

(3) Parts for Which Design Data (Default Data) is Used

Main controller 150 in performing calibration uses default data for a distance L02 between positions P11 and P41, a distance L32 between positions P32 and P33, a distance L33 between positions P33 and P34, and a distance L34 between positions P32 and P34.

Position P41 is a position where a pin is inserted for connecting the bottom of boom cylinder 111 to the body of the work vehicle. Position P32 is a position where a pin is inserted for connecting bucket 130 to dipper stick 120.

Position P33 is a position where a pin is inserted for fixing one end of link mechanism 136 of bucket 130 and one end of a link mechanism 137 of bucket 130 to the rod of bucket cylinder 131. Position P34 is a position where a pin is inserted for fixing the other end of link mechanism 137 to the bottom of bucket 130.

FIG. 5 generally represents data D5 stored in work vehicle 100.

As shown in FIG. 5, in data D5, design data, a working data-based dimension (an actual dimension), and an image data (measurement data)-based dimension (an actual dimension) are stored in association with one another.

In data D5, as the design data, 19 pieces of data from Nos. 1 to 19 are stored. The design data includes a designed dimension, and in addition, a designed angle for boom 110, a designed angle for dipper stick 120, a designed angle for bucket 130, and the like.

The working data-based dimension and the image data-based dimension are values obtained by work vehicle 100 from server device 200.

FIG. 6 shows data D6 for illustrating the calibration process and calibrated values.

As shown in FIG. 6, main controller 150 obtains actual dimensions from server device 200 for distances L01, L11, L12, L13, L21, L22, L22, L24, and L31.

Therefore, main controller 150 in performing a calibration uses the actual dimensions for distances L01, L11, L12, L13, L21, L22, L23, L24, L31. Further, main controller 150 uses the design data for the other parameters (distances L02, L32, L33, L34, Lbms, Lams, Lbks, and angles Phibm, Phiam, Phibk). Distances Lbms, Lams, and Lbks are parameters for boom cylinder 111, dipper stick cylinder 121, and bucket cylinder 131, respectively. Angles Phibm, Phiam, and Phibk are parameters for boom 110, dipper stick 120, and bucket 130, respectively.

Main controller 150 uses these 19 values (the actual dimension data and the design data) to calibrate the 19 pieces of design data (or default values). Main controller 150 thus obtains calibrated values. The calculation employs the same calculation method as used when a conventional measuring instrument such as a total station is used, and accordingly, it will not be described herein.

Note that boom 110, dipper stick 120, boom cylinder 111, dipper stick cylinder 121, and bucket cylinder 131 are examples of a "component" in the present invention. Server device 200 is an example of an "information processing device" in the present invention. Dipper stick cylinder 121 and boom cylinder 111 are examples of a "first cylinder" and a "second cylinder," respectively.

Moreover, in the present example, of the 19 pieces of design data of Nos. 1 to 19 shown in FIG. 5, two pieces of design data of Nos. 1 and 10 are an example of "second design data" in the present invention. At least each of the 17 pieces of design data other than the two pieces of design data is an example of "first design data" in the present invention. The "first design data" in the present invention may be the same as the "second design data" in the present invention.

<Summary>

Thus, it can be said that work vehicle 100 has the following configuration:

(1) Work vehicle 100 comprises work implement 104 including bucket 130 having teeth 139, and main controller 150 that uses a dimension obtained based on manufacturing data of a component included in work implement 104 (hereinafter also referred to as a "first dimension") to calibrate design data used for calculating the position of teeth 139 (hereinafter also referred to as "first design data") and uses the calibrated first design data to calculate the position of teeth 139.

As one example, main controller 150 uses a dimension obtained based on working data obtained when machining the component included in work implement 104 to calibrate the first design data used for calculating the position of teeth 139 and uses the calibrated first design data to calculate the position of teeth 139.

As a dimension based on manufacturing data (e.g., working data) is used, it is unnecessary to use a measuring instrument or the like on the production line for work vehicle 100. When this is compared with using such a measuring instrument, the former allows the first design data to be calibrated faster than the latter.

The component includes, for example, boom 110, boom cylinder 111 that drives boom 110, dipper stick 120, and dipper stick cylinder 121 that drives dipper stick 120. The first design data is design data of the component.

(2) Main controller 150 obtains the dimension from server device 200 communicably connected to work vehicle 100. This eliminates the necessity of work vehicle 100 performing the process of calculating the first dimension from a coordinate value.

(3) Main controller 150 uses a dimension between teeth 139 and bucket pin 142 calculated based on image data including bucket 130 as a subject (hereinafter also referred to as a "second dimension") to further calibrate design data representing a designed dimension between teeth 139 and bucket pin 142 (hereinafter also referred to as "second design data"). Main controller 150 further uses the calibrated second design data to calculate the position of teeth 139.

As an image data-based dimension is used, it is unnecessary to use a measuring instrument or the like on the production line. When this is compared with using such a measuring instrument, the former allows the second design data to be calibrated faster than the latter.

(4) Main controller 150 uses a dimension between receiving antenna 109 and foot pin 141 calculated based on image data including receiving antenna 109 and foot pin 141 as a subject (hereinafter also referred to as a "second dimension") to further calibrate design data representing a designed dimension between receiving antenna 109 and foot pin 141 (hereinafter also referred to as "second design data"). Main controller 150 further uses the calibrated second design data to calculate the position of teeth 139.

As an image data-based dimension is used, it is unnecessary to use a measuring instrument or the like on the production line. When this is compared with using such a measuring instrument, the former allows the second design data to be calibrated faster than the latter.

(5) Main controller 150 uses the first dimension and the second dimension to calibrate the first design data and the second design data. The first design data and the second design data are calibrated using two dimensions. This allows more precise calibration than using one dimension.

(6) Main controller 150 obtains the second dimension from server device 200 communicably connected to work vehicle 100. This eliminates the necessity of work vehicle 100 performing the process of calculating the second dimension from a coordinate value.

<Server Device 200>

Figure 7:
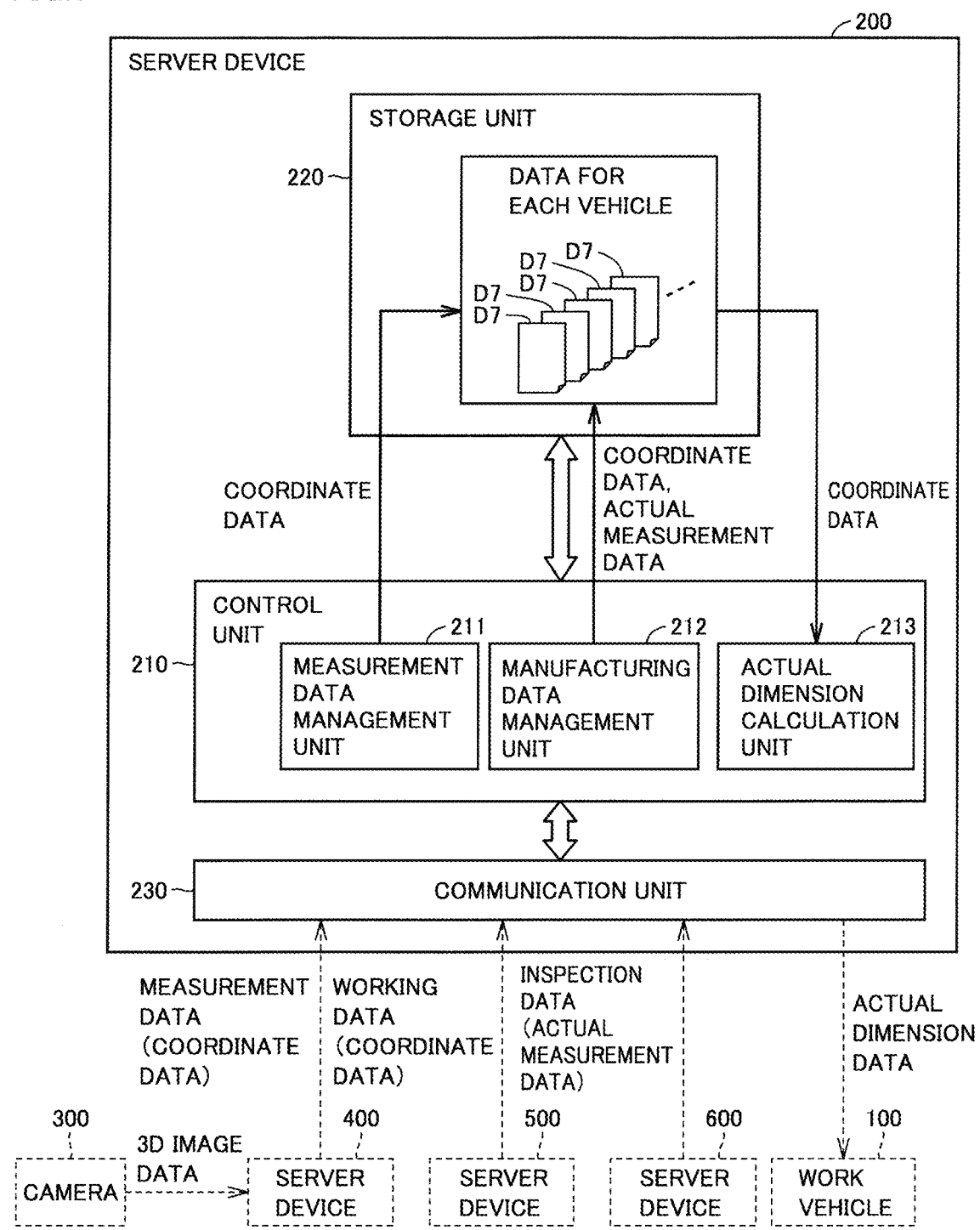
FIG. 7 is a functional block diagram representing a functional configuration of a server device.

FIG. 7 is a functional block diagram representing a functional configuration of server device 200.

As shown in FIG. 7, server device 200 comprises a control unit 210, a storage unit 220, and a communication unit 230. Control unit 210 includes a measurement data management unit 211, a manufacturing data management unit 212, and an actual dimension calculation unit 213. Storage unit 220 stores data D7 therein for each work vehicle. Data D7 will be described hereinafter (FIG. 7).

Control unit 210 generally controls server device 200. Control unit 210 is implemented by a processor, which will be described hereinafter, running and executing an operating system and a program, respectively, stored in a memory.

Communication unit 230 is an interface for communicating with server devices 400, 500 and 600, and work vehicle 100. Communication unit 230 obtains measurement data (coordinate data) from server device 400 to which camera 300 is connected. Communication unit 230 obtains manufacturing data from server devices 500 and 600.

Measurement data management unit 211 manages measurement data obtained from server device 400. Measurement data management unit 211 refers to an imaged work vehicle's machine number and writes the measurement data in a piece of a plurality of pieces of data D7 that is associated with the machine number.

Manufacturing data management unit 212 manages the working data (coordinate data) obtained from server device 500 and the inspection data (actual measurement data) obtained from server device 600. Manufacturing data management unit 212 refers to a machine number transmitted from server devices 500 and 600 in association with manufacturing data (working data and inspection data) and writes the measurement data in a piece of a plurality of pieces of data D7 that is associated with the machine number.

FIG. 8 represents a schematic configuration of data D7.

As shown in FIG. 8, in data D7, working data (coordinate data) and image data (coordinate data) of a single work vehicle 100 are associated with pin hole or reflector identifiers (P11, P12, . . . ) and thus stored. Although not shown, inspection data (measurement data representing the actual length of each cylinder) is also stored in data D7.

Further, as shown in FIG. 7, in response to a request from work vehicle 100, actual dimension calculation unit 213 refers to data D7 corresponding to the machine number of that work vehicle and calculates an actual dimension. In the present example, actual dimension calculation unit 213 uses the working data (coordinate data) shown in FIG. 8 to calculate distances L11, L12, L13, L21, L22, L23, L24 (see FIGS. 5 and 4). Further, actual dimension calculation unit 213 uses the image data (coordinate data) shown in FIG. 8 to calculate distances L01 and L31 (see FIGS. 5 and 4).

Communication unit 230 transmits actual dimension data representing actual dimensions calculated by actual dimension calculation unit 213 to work vehicle 100 that is a sender of the request. When work vehicle 100 uses actual measurement data of a cylinder length to calibrate a plurality of pieces of design data, work vehicle 100 also obtains actual measurement data as actual dimension data from server device 200.

By the above process, work vehicle 100 can obtain actual dimension data for the vehicle (i.e., distances L11, L12, L13, L21, L22, L23, L24, L01, L31) used for calibrating a plurality of pieces of design data (the 19 parameters shown in FIG. 6) used for calculating the teeth position (see FIG. 5 and FIG. 6).

Figure 9:
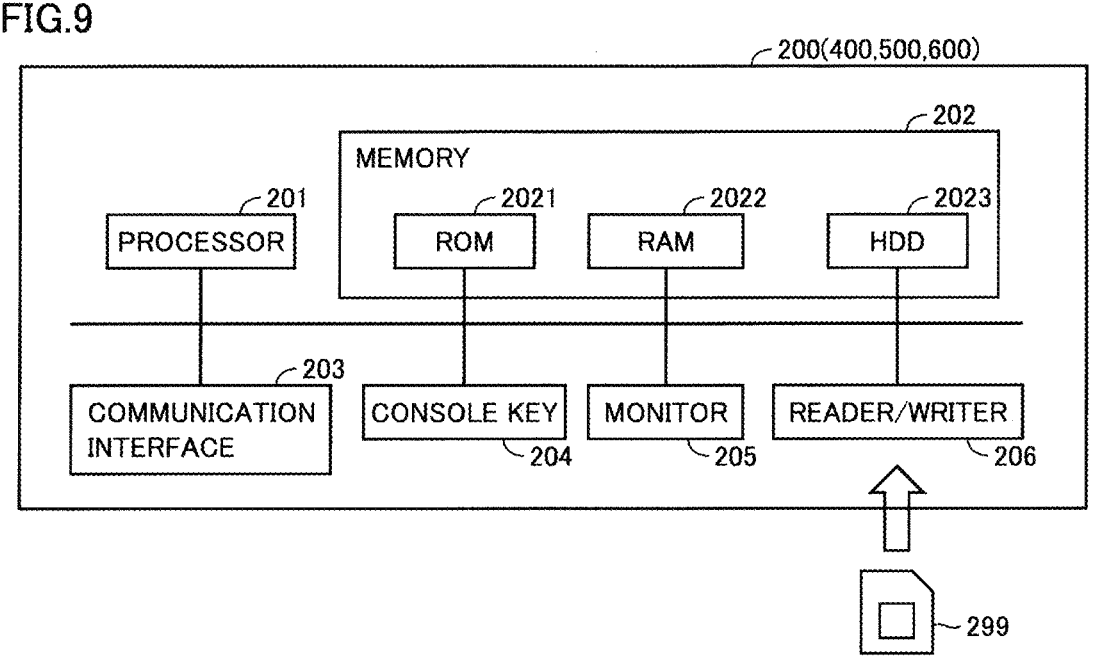
FIG. 9 represents a hardware configuration of a server device.

FIG. 9 represents a hardware configuration of server device 200.

As illustrated in FIG. 9, server device 200 includes a processor 201, a memory 202, a communication interface 203, a console key 204, a monitor 205, and a reader/writer 206. Memory 202 typically includes a ROM 2021, a RAM 2022, and an HDD (Hard Disc) 2023. Reader/writer 206 reads a variety of types of data including a program from a memory card 299 as a storage medium and writes data in memory card 299.

Processor 201 corresponds to control unit 210 shown in FIG. 7. More specifically, control unit 310 is implemented by processor 201 executing a program stored in memory 202. Memory 202 corresponds to storage unit 220 in FIG. 7. Communication interface 203 corresponds to communication unit 230 in FIG. 7.

Processor 201 executes a program stored in memory 202. RAM 2022 temporarily stores various programs, data generated by processor 201 executing a program, and data input by a user. ROM 2021 is a non-volatile storage medium, and typically stores a BIOS (Basic Input Output System) and firmware. HDD 2023 stores an OS (operating system), various application programs, and the like.

Software such as a program or the like stored in memory 202 may be stored in a memory card or another storage medium and distributed as a program product. Alternatively, the software may be provided as a downloadable program product by an information provider connected to the so-called Internet. Such software is read from the storage medium by a memory card reader/writer or another reader device or downloaded via an interface, and subsequently, temporarily stored in RAM 2022. The software is read from RAM 2022 by processor 201, and is further stored in HDD 2023 in the form of an executable program. Processor 201 executes the program.

Each component constituting server device 200 shown by the figure is a generally used component. Therefore, an essential part of the present invention can be said to be software stored in memory 202, a memory card or another storage medium, or software downloadable via a network.

The storage medium is not limited to a DVD (Digital Versatile Disc)-ROM, a CD (Compact Disc)-ROM, an FD (Flexible Disk) or a hard disk. For example, it may be magnetic tape, cassette tape, an optical disc (MO (Magnetic Optical Disc)/MD (Mini Disc)), an optical card, a mask ROM, EPROM (Electronically Programmable Read-Only Memory), EEPROM (Electronically Erasable Programmable Read-Only Memory), a flash ROM or a similar semiconductor memory which is a medium carrying a program in a fixed manner. Furthermore, the storage medium is a non-transitory medium allowing a computer to read a program and the like therefrom, and does not include a transitory medium such as a carrier wave.

Furthermore, a program as referred to herein includes not only a program directly executable by processor 201 but also a program in the form of a source program, a compressed program, an encrypted program, and the like.

Server devices 400, 500, and 600 have the same hardware configuration as server device 200, and accordingly, their hardware configuration will not be described repeatedly.

<Work Vehicle 100>

Figure 10:
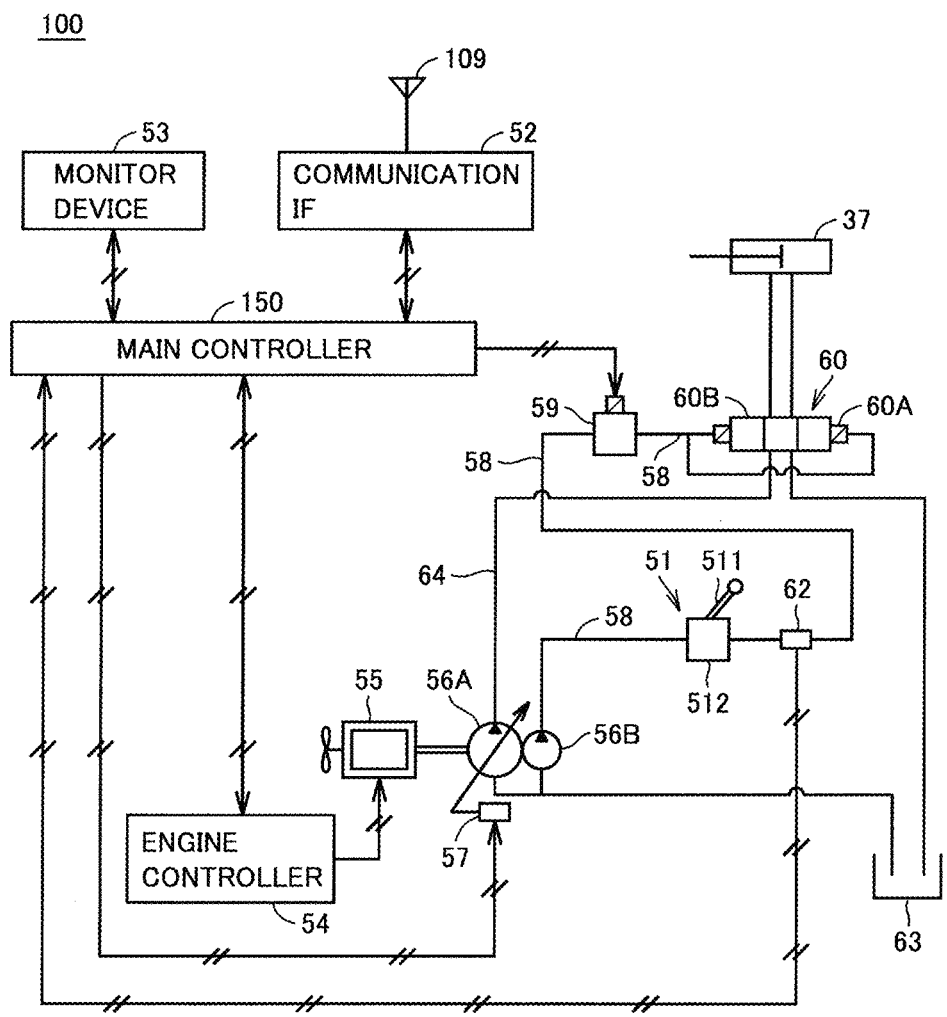
FIG. 10 represents a hardware configuration of a work vehicle.

FIG. 10 represents a hardware configuration of work vehicle 100.

As shown in FIG. 10, work vehicle 100 includes a cylinder 37, an operation device 51, a communication interface (IF) 52, a monitor device 53, an engine controller 54, an engine 55, a main pump 56A, and a pilot pump 56B, a swash plate drive device 57, a pilot oil path 58, an electromagnetic proportional control valve 59, a main valve 60, a pressure sensor 62, a tank 63, a hydraulic oil path 64, receiving antenna 109, and main controller 150.

Note that cylinder 37 represents any one of boom cylinder 111, dipper stick cylinder 121, and bucket cylinder 131. Cylinder 37 drives one of boom 110, dipper stick 120 and bucket 130.

Operation device 51 includes a control lever 511 and an operation detector 512 that detects an amount of operating control lever 511. Main valve 60 has a spool 60A and a pilot chamber 60B.

Operation device 51 is a device for operating work implement 104. In the present example, operation device 51 is a hydraulic device. Operation device 51 receives oil from pilot pump 56B.

Pressure sensor 62 senses the pressure of the oil discharged from operation device 51. Pressure sensor 62 outputs a sensed result to main controller 150 as an electrical signal.

Engine 55 has a drive shaft for connecting to main pump 56A and pilot pump 56B. As engine 55 rotates, main pump 56A and pilot pump 56B discharge hydraulic oil.

Engine controller 54 controls an operation of engine 55 in accordance with an instruction issued from main controller 150.

Main pump 56A supplies through hydraulic oil path 64 hydraulic oil used to drive work implement 104. Swash plate drive device 57 is connected to main pump 56A. Pilot pump 56B supplies hydraulic oil to electromagnetic proportional control valve 59 and operation device 51.

Swash plate drive device 57 is driven in response to an instruction received from main controller 150 to change an inclination angle of the swash plate of main pump 56A.

Monitor device 53 is communicably connected to main controller 150. Monitor device 53 notifies main controller 150 of an instruction input by the operator. Monitor device 53 displays a variety of indications in response to an instruction received from main controller 150.

Main controller 150 is a controller that generally controls work vehicle 100, and composed of a central processing unit (CPU), a non-volatile memory, a timer, and the like. Main controller 150 controls engine controller 54 and monitor device 53.

Main controller 150 receives an electrical signal from pressure sensor 62. Main controller 150 generates a command current according to the electrical signal Main controller 150 outputs the generated command current to electromagnetic proportional control valve 59.

Main controller 150 calculates positional information of teeth 139 of bucket 130 based on a variety of types of information such as the vehicular body's positional information obtained via receiving antenna 109 for GNSS, a stroke length of cylinder 37, and information from an inertial sensor unit (not shown) incorporated in the vehicular body. Main controller 150 matches the positional information to execution design data and accordingly controls the operation of work implement 104 (boom 110, dipper stick 120, bucket 130) so as not to damage a design surface. When main controller 150 determines that teeth 139 has reached the design surface, main controller 150 automatically stops work implement 104 or moves teeth 139 along the design surface via an assistive function.

Further, main controller 150 performs the above-described calibration process to calculate the accurate position of teeth 139.

Electromagnetic proportional control valve 59 is provided in pilot oil path 58 connecting pilot pump 56B and pilot chamber 60B of main valve 60, and uses hydraulic pressure supplied from pilot pump 56B to generate command pilot pressure in accordance with a command current provided from main controller 150.

Main valve 60 is provided between electromagnetic proportional control valve 59 and cylinder 37. Main valve 60 adjusts the flow rate of the hydraulic oil that operates cylinder 37 based on the command pilot pressure generated by electromagnetic proportional control valve 59.

Tank 63 is a tank for storing oil used by main pump 56A and pilot pump 56B.

Figure 11:
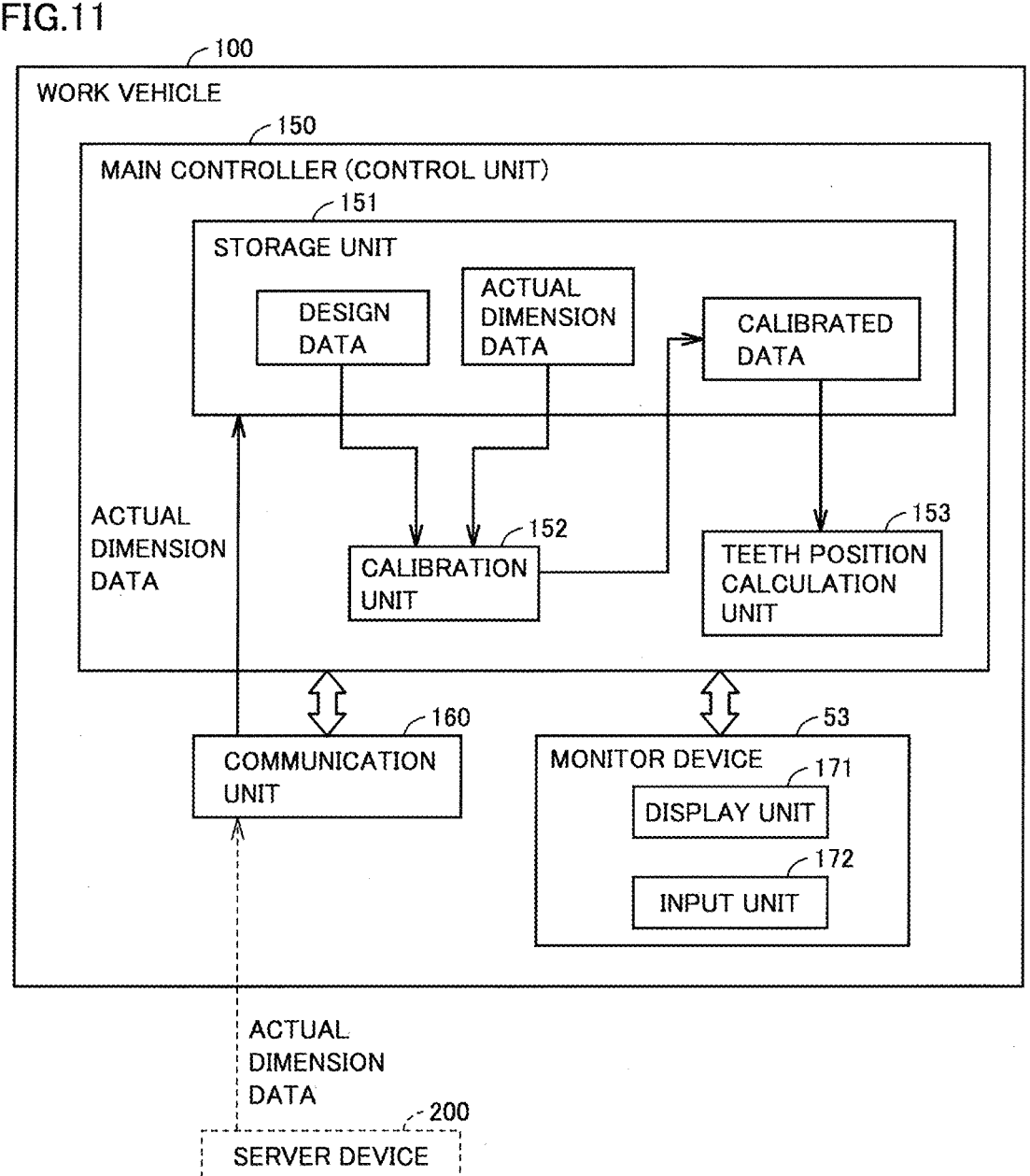
FIG. 11 is a functional block diagram representing a functional configuration of a work vehicle.

FIG. 11 is a functional block diagram representing a functional configuration of work vehicle 100.

As shown in FIG. 11, work vehicle 100 includes main controller 150, a communication unit 160, and monitor device 53. Main controller 150 has a storage unit 151, a calibration unit 152, and a teeth position calculation unit 153. Monitor device 53 has a display unit 171 and an input unit 172.

Communication unit 160 is an interface for communicating with server device 200. Communication unit 160 obtains the actual dimension data described above from server device 200, and transmits the actual dimension data to main controller 150. The actual dimension data is stored in storage unit 151.

Storage unit 151 previously stores therein a plurality of pieces of design data such as a designed dimension and a designed angle. For the present example, the 19 pieces of design data shown in FIG. 5 are previously stored in storage unit 151 of main controller 150.

Calibration unit 152 uses the actual dimension data for distances L01, L11, L12, L13, L21, L22, L23, L24, L31 and uses the design data per se for the other parameters (distances L02, L32, L33, L34, Lbms, Lams, Lbks, and angles Phibm, Phiam, Phibk) to calibrate these 19 parameters, as has been described with reference to FIG. 6. Calibration unit 152 stores the thus calibrated data in storage unit 151.

Teeth position calculation unit 153 uses the calibrated data to calculate the position of teeth 139.

Input unit 172 receives a variety of input operations. In one aspect, input unit 172 receives an instruction to perform the calibration process. For example, input unit 172 receives an instruction from the operator to obtain actual dimension data from server device 200.

Display unit 171 displays a variety of screens. For example, display unit 171 displays a variety of guidance for the calibration process.

<Control Structure>

Figure 12:
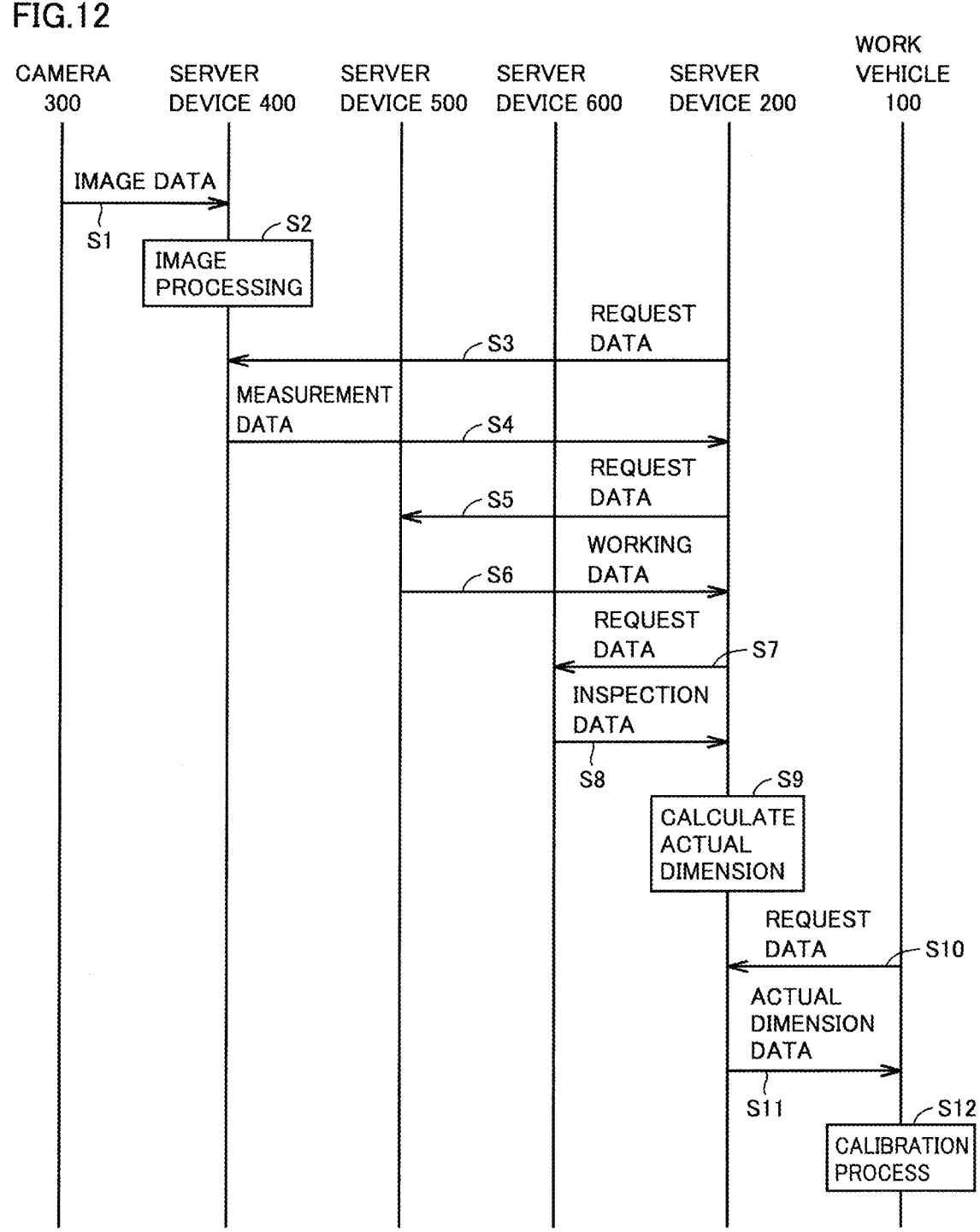
FIG. 12 is a sequence diagram for illustrating a flow of a process in the calibration system.

FIG. 12 is a sequence diagram for illustrating a flow of a process in calibration system 1.

As shown in FIG. 12, in sequence S1, camera 300 images work vehicle 100 to obtain image data, and sends the image data to server device 400. In sequence S2, server device 400 subjects the received image data to predetermined image-processing to calculate three-dimensional coordinate data (measurement data) between reflectors. Server device 400 calculates three-dimensional coordinate data of the reflectors for each of a plurality of work vehicles 100.

In sequence S3, server device 200 requests server device 400 to transmit measurement data. In sequence S4, server device 400 transmits the measurement data to server device 200.

In sequence S5, server device 200 requests server device 500 to transmit measurement data. In sequence S6, server device 500 transmits working data to server device 200.

In sequence S7, server device 200 requests server device 600 to transmit measurement data. In sequence S8, server device 600 transmits inspection data to server device 200.

In sequence S9, server device 200 calculates actual dimensions of distances L01, L11, L12, L13, L21, L22, L23, L24, L31 based on the received measurement data, working data, and inspection data (see FIGS. 4 and 5). When the inspection data obtained from server device 600 is not used, server device 200 calculates the actual dimensions of distances L01, L11, L12, L13, L21, L22, L22, L23, L24, L31 based on the received measurement data and working data.

In sequence S10, work vehicle 100 requests server device 200 to transmit the vehicle's actual dimension data used for calibration. In sequence S11, server device 200 transmits the requester's actual dimension data to the requester or work vehicle 100. In sequence S12, work vehicle 100 performs a calibration process using the obtained actual dimension data.

<Modification>

(1) In the above embodiment, main controller 150 uses a dimension obtained based on manufacturing data of a component included in work implement 104 to calibrate design data used for calculating the position of teeth 139 and uses the calibrated design data to calculate the position of teeth 139. However, it is also possible to quickly obtain design data used for calculation of the position of teeth 139 without performing such calibration. Hereinafter, such a configuration will be described.

In the present modification, main controller 150 obtains design data based on a dimension obtained from manufacturing data, and used for calculating the position of teeth 139, and uses the design data to calculate the position of teeth 139. Further, main controller 150 obtains design data based on a dimension obtained from image data, and used for calculating the position of teeth 139, and uses the design data to calculate the position of teeth 139.

When this is described with reference to FIG. 5 showing data D5, main controller 150 uses working data-based dimensions as design data for parameters of Nos. 3 to 9 and uses image data-based dimensions as design data for parameters of Nos. 1 and 10. For example, for the parameter for No. 3, as design data, instead of "*. 12," "*. 35," which is a working data-based dimension, is used.

Main controller 150 calculates the position of teeth 139 using design data of 19 parameters including these working data- and image data-based actual dimensions. More specifically, main controller 150 for example substitutes ten values in the FIG. 6 data D6 indicated at the "design data" column, seven values in the data indicated at the "working data-based dimension" column, and two values in the data indicated at the "image data-based dimension" column without calibration into parameters (or variables) in a program for calculating the position of teeth 139. Thus, main controller 150 calculates the position of teeth 139.

Such a configuration eliminates the necessity of main controller 150 performing the calibration process. The present modification allows design data used for calculating the position of teeth 139 to be obtained faster than a configuration with the calibration process performed.

Further, manufacturing data-based dimension and image data-based dimension are used, and it is unnecessary to use a measuring instrument or the like on the production line for work vehicle 100. Therefore, design data used for calculating the position of teeth 139 can be obtained rapidly, even when compared with such a case that employs a measuring instrument.

(2) While in the above description, as shown in FIG. 12 by sequences S10 and S11, work vehicle 100 requests server device 200 to transmit actual dimension data by way of example, this is not exclusive.

For example, an operator or the like of work vehicle 100 may use a tablet terminal (not shown) to download actual dimension data to the tablet terminal. In that case, the operator refers to the actual dimension data displayed on the tablet terminal, and manually stores the data in storage unit 151 of main controller 150 via monitor device 53.

Even with such a configuration, it is unnecessary to use a measuring instrument such as a total station. For this reason, the above-mentioned plurality of pieces of design data (or parameters) can be calibrated faster than when such a measuring instrument is used.

(3) In the above description, a machine number is used as information for identifying each work vehicle 100 from one another by way of example. However, the information is not limited to a machine number insofar as the information is a unique identification number. This also applies to the following second embodiment.

Second Embodiment

In an embodiment, a configuration has been described in which server device 200 calculates an actual dimension by using data D7 of FIG. 8. In the present embodiment, a configuration will be described in which a work vehicle configuring calibration system 1 calculates an actual dimension by using data D7. Note that calibration system 1 comprises a work vehicle 100A instead of work vehicle 100. Hereinafter, a configuration different from the first embodiment will be described, and identical configuration(s) will not be described repeatedly.

Figure 13:
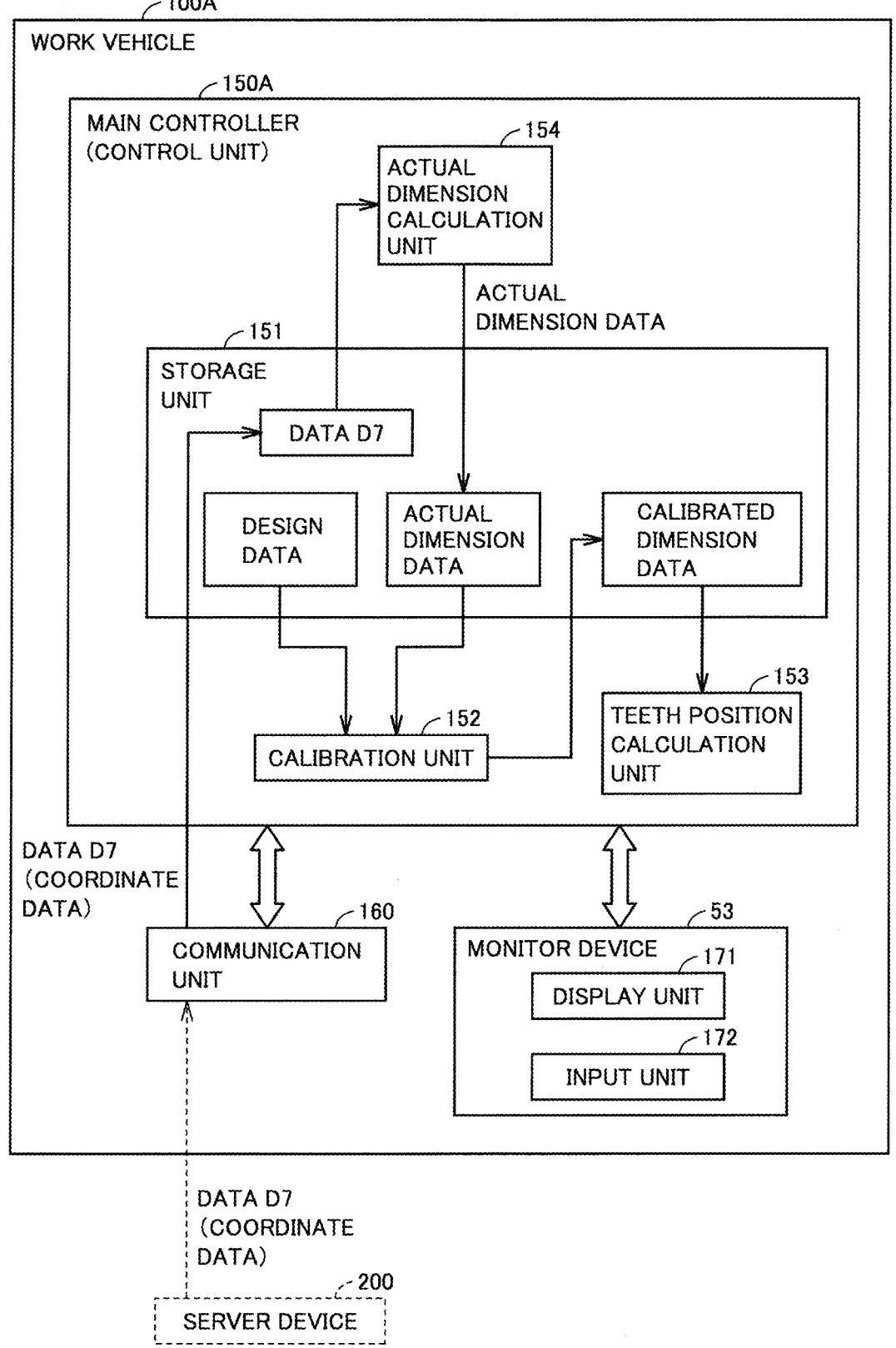
FIG. 13 is a functional block diagram representing a functional configuration of a work vehicle according to another embodiment.

FIG. 13 is a functional block diagram representing a functional configuration of work vehicle 100A according to the present embodiment. Work vehicle 100A has the same hardware configuration as work vehicle 100, and accordingly, its hardware configuration will not be described repeatedly.

As shown in FIG. 13, work vehicle 100A includes a main controller 150A, communication unit 160, and monitor device 53. Main controller 150A has storage unit 151, calibration unit 152, teeth position calculation unit 153, and an actual dimension calculation unit 154. Main controller 150A differs from main controller 150 of the first embodiment in that main controller 150A includes actual dimension calculation unit 154.

Communication unit 160 in the present embodiment obtains its vehicle's data D7 (coordinate data) from server device 200, and transmits data D7 to main controller 150A. Main controller 150A stores data D7 in the storage unit. Thus, in storage unit 151, as shown in data D7 (see FIG. 7), working data (coordinate data) and image data (coordinate data) are associated with the machine number of work vehicle 100A and thus stored.

Actual dimension calculation unit 154 refers to data D7 obtained and accordingly calculates an actual dimension in the same manner as actual dimension calculation unit 213 (FIG. 7) of server device 200 of the first embodiment does. Actual dimension calculation unit 154 stores the calculated value (an actual dimension) in storage unit 151 as actual dimension data.

The processing by calibration unit 152 and the processing by teeth position calculation unit 153 are the same as those in the first embodiment, and accordingly, will not be described repeatedly.

Such a configuration, as well as the first embodiment, also uses a dimension based on actual working data obtained in machining, and does not need to use a measuring instrument such as a total station. When this is compared with using such a measuring instrument, the former allows the plurality of pieces of design data to be calibrated faster than the latter.

In the present embodiment, work vehicle 100A calculates an actual dimension, and accordingly, server device 200 does not need actual dimension calculation unit 213 (see FIG. 7).

FIG. 14 is a sequence diagram for illustrating a flow of a process in calibration system 1 according to the present embodiment.

As shown in FIG. 14, sequences S1 to S8 are the same as sequences S1 to S8 shown in FIG. 12 in the first embodiment, and accordingly, will not be described repeatedly.

After sequence S8, work vehicle 100A in sequence S21 requests server device 200 to transmit the vehicle's data D7 (coordinate data) used for calibration. In sequence S22, server device 200 transmits the requester's data D7 to the requester or work vehicle 100A. When work vehicle 100A also uses inspection data obtained from server device 600 to perform calibration, server device 200 transmits not only the coordinate data but also the inspection data to work vehicle 100A.

In sequence S23, work vehicle 100A calculates an actual dimension with reference to data D7. In sequence S24, work vehicle 100A performs a calibration process using the obtained actual dimension data.

<Summary>

Thus, it can be said that work vehicle 100A has the following configuration:

(1) Work vehicle 100A comprises work implement 104 including bucket 130 having teeth 139, and main controller 150A that uses a dimension obtained based on manufacturing data of a component included in work implement 104 (i.e., a "first dimension") to calibrate design data used for calculating the position of teeth 139 (i.e., "first design data") and uses the calibrated first design data to calculate the position of teeth 139.

As one example, main controller 150A uses a dimension obtained based on working data obtained when machining a component included in work implement 104 to calibrate design data used for calculating the position of teeth 139 and uses the calibrated first design data to calculate the position of teeth 139.

As a dimension based on manufacturing data (e.g., working data) is used, it is unnecessary to use a measuring instrument or the like on the production line for work vehicle 100A. When this is compared with using such a measuring instrument, the former allows the first design data to be calibrated faster than the latter.

(2) Main controller 150A obtains working data (coordinate data) from server device 200 communicably connected to work vehicle 100A. Main controller 150A obtains the first dimension based on the obtained working data. This eliminates the necessity of server device 200 performing the process of calculating the first dimension from a coordinate value.

(3) Main controller 150A obtains image data from server device 200 communicably connected to work vehicle 100A, and obtains (or calculates) a second dimension based on the obtained image data. This eliminates the necessity of server device 200 performing the process of calculating the second dimension from a coordinate value. Note that the "second dimension" is a dimension between teeth 139 and bucket pin 142 and a dimension between receiving antenna 109 and foot pin 141 in the present example.

<Modification>

As well as in the modification of the first embodiment, main controller 150A may be configured to obtain design data based on a dimension obtained from manufacturing data, and used for calculating the position of teeth 139, and uses the design data to calculate the position of teeth 139. Further, main controller 150A may be configured to obtain design data based on a dimension obtained from image data, and used for calculating the position of teeth 139, and uses the design data to calculate the position of teeth 139.

(2) An operator or the like of work vehicle 100A may use a tablet terminal (not shown) to download data D7 (coordinate data) to the tablet terminal. In that case, the operator refers to data D7 displayed on the tablet terminal, and manually stores the data in storage unit 151 of main controller 150 via monitor device 53. Such a configuration also allows the plurality of pieces of design data to be calibrated rapidly.

It should be understood that the embodiments disclosed herein are illustrative and not limited to the above disclosure. The scope of the present invention is defined by the terms of the claims, and is intended to include any modifications within the meaning and scope equivalent to the terms of the claims.

REFERENCE SIGNS LIST 1 calibration system, 37 cylinder, 51 operation device, 53 monitor device, 54 engine controller, 55 engine, 56A main pump, 56B pilot pump, 57 swash plate drive device, 58 pilot oil path, 59 electromagnetic proportional control valve, 60 mains valve, 60A spool, 60B pilot chamber, 62 pressure sensor, 63 tank, 64 hydraulic oil path, 100, 100A work vehicle, 101 travel unit, 103 revolving unit, 104 work implement, 107 handrail, 108 operator's cab, 109 receiving antenna, 110 boom, 111 boom cylinder, 120 dipper stick, 121 dipper stick cylinder, 130 bucket, 131 bucket cylinder, 136, 137 link mechanism, 139 teeth, 150, 150A main controller, 151, 220 storage unit, 152 calibration unit, 153 teeth position calculation unit, 154, 213 actual dimension calculation unit, 160, 230 communication unit, 171 display unit, 172 input unit, 200, 400, 500, 600 server device, 201 processor, 202 memory, 203 communication interface, 204 console key, 205 monitor, 210, 310 control unit, 211 measurement data management unit, 212 manufacturing data management unit, 299 memory card, 300 camera, 511 control lever, 512 operation detector, 700 network, 800 transceiver, 900 casting, C11, C12, C21, C22 hole, D2, D5, D6, D7 data, Q1, Q2, Q3 center position.

The invention claimed is:

1. An earthmoving machine comprising:
work implement including a bucket having teeth; and
a controller that:
   obtains, based on a first dimension obtained from manufacturing data of a component included in the work implement, first design data used for calculating a position of the teeth,
   uses the first design data to calculate the position of the teeth, and
   controls operation of the work implement of the earthmoving machine to prevent damage to a design surface based on the calculated position of the teeth.

2. The earthmoving machine according to claim 1, wherein
the controller uses the first dimension to calibrate the first design data and uses the calibrated first design data to calculate the position of the teeth.

3. The earthmoving machine according to claim 1, wherein
the work implement further includes a boom as the component, and
the first design data includes design data of the boom.

4. The earthmoving machine according to claim 3, wherein
the work implement further includes as the component a first cylinder that drives the boom, and
the first design data includes design data of the first cylinder.

5. The earthmoving machine according to claim 3, wherein
the work implement further includes a dipper stick as the component, and
the first design data includes design data of the dipper stick.

6. The earthmoving machine according to claim 5, wherein
the work implement further includes as the component a second cylinder that drives the dipper stick, and
the first design data includes design data of the second cylinder.

7. The earthmoving machine according to claim 1, wherein
the work implement further includes a dipper stick and a bucket pin that connects the bucket to the dipper stick, and
the controller
uses a second dimension between the teeth and the bucket pin calculated based on image data including the bucket as a subject to calibrate second design data representing a designed dimension between the teeth and the bucket pin, and
further uses the calibrated second design data to calculate the position of the teeth.

8. The earthmoving machine according to claim 7 wherein the controller uses the first dimension and the second dimension to calibrate the second design data.

9. The earthmoving machine according to claim 1, further comprising a receiving antenna for a global positioning satellite system, wherein
the work implement further includes a boom, and a foot pin attaching the boom to a vehicular body, and
the controller
uses a second dimension between the receiving antenna and the foot pin calculated based on image data including the receiving antenna and the foot pin as a subject to calibrate second design data representing a designed dimension between the receiving antenna and the foot pin, and
further uses the calibrated second design data to calculate the position of the teeth.

10. The earthmoving machine according to claim 9 wherein the controller uses the first dimension and the second dimension to calibrate the second design data.

11. A calibration system comprising:
an earthmoving machine; and
an information processing device capable of communicating with the earthmoving machine,
the earthmoving machine having a work implement including a bucket having teeth,
the information processing device transmitting manufacturing data of a component included in the work implement to the earthmoving machine,
the earthmoving machine:
calculating a dimension of the component based on the manufacturing data received from the information processing device,
using the dimension to calibrate design data used for calculating a position of the teeth,
using the calibrated design data to calculate the position of the teeth, and
controlling operation of the work implement of the earthmoving machine to prevent damage to a design surface based on the calculated position of the teeth.

12. A method for calculating a position of teeth of a bucket included in a work implement, comprising:
obtaining manufacturing data of a component included in the work implement;
calculating a dimension of the component based on the manufacturing data;
using the dimension to calibrate a plurality of pieces of design data used for calculating the position of the teeth;
using the calibrated design data to calculate the position of the teeth; and
controlling operation of the work implement of the earthmoving machine to prevent damage to a design surface based on the calculated position of the teeth.

* * * * *